US007006694B1

(12) United States Patent
Melikian et al.

(10) Patent No.: US 7,006,694 B1
(45) Date of Patent: Feb. 28, 2006

(54) SYSTEM AND METHOD FOR PATTERN IDENTIFICATION

(75) Inventors: Simon Haig Melikian, Westlake, OH (US); Daren Benedykt Tyminski, Boston, MA (US)

(73) Assignee: Coreco Imaging, Inc., Bedford, MA (US)

( * ) Notice: Subject to any disclaimer, the term of this patent is extended or adjusted under 35 U.S.C. 154(b) by 519 days.

(21) Appl. No.: 09/680,052

(22) Filed: Oct. 5, 2000

(51) Int. Cl.
G06K 9/48 (2006.01)
(52) U.S. Cl. ...................................... 382/199; 382/197
(58) Field of Classification Search ................ 382/199, 382/190, 216, 217, 218, 197, 289, 291
See application file for complete search history.

(56) References Cited

U.S. PATENT DOCUMENTS

| 4,648,024 A | * | 3/1987 | Kato et al. ................... 700/187 |
| 4,901,362 A | * | 2/1990 | Terzian ........................ 382/197 |
| 5,033,099 A | * | 7/1991 | Yamada et al. ............. 382/197 |
| 5,351,310 A |   | 9/1994 | Califano et al. |
| 5,600,733 A | * | 2/1997 | MacDonald et al. ........ 382/144 |
| 5,611,036 A | * | 3/1997 | Berend et al. ............... 345/441 |
| 5,943,441 A | * | 8/1999 | Michael ....................... 382/199 |

OTHER PUBLICATIONS

Ballard, "Generalizing the Hough Transform to Detect Arbitrary Shapes," *Pattern Recognition*, vol. 13, No. 2, pp. 111-122, 1981.

Ayache et al., "HYPER: A New Approach for the Recognition and Positioning of Two-Dimensional Objects," *IEEE Transactions on Pattern Analysis and Machine Intelligence*, vol. PAMI-8, No. 1, pp. 44-54, 1986.

Huttenlocher et al., "Recognizing Solid Objects by Alignment with an Image," *International Journal of Computer Vision*, vol. 5, No. 2, pp. 195-212, 1990.

(Continued)

*Primary Examiner*—Vikkram Bali
*Assistant Examiner*—Colin LaRose
(74) *Attorney, Agent, or Firm*—Hunton & Williams

(57) ABSTRACT

A system and method for pattern identification are disclosed. According to one embodiment of the present invention, the method for locating a pattern includes the steps of (1) providing a pattern image corresponding to the pattern to be located; (2) extracting a pattern contour from the pattern image; (3) generating vector information for the pattern contours, relative to a reference point; (4) creating a reference table for storing the vector information, the reference tables corresponding to the pattern contour; (5) providing a scene image, which will be searched for the pattern; (6) extracting a scene contour from the scene image; (7) generating vector information for the scene contours; and (8) determining whether the pattern has been located within the scene image using the reference table and the vector information for the scene contour. According to another embodiment, a system includes a first image capture device that captures a pattern image which includes an image of a pattern; a second image capture device that captures a scene image to be searched for the pattern; a processor for processing the images, which includes means for extracting at least one pattern contour from the pattern image; means for generating vector information for each of said at least one pattern contours, relative to a reference point; means for creating at least one reference table for storing vector information, each of said at least one reference tables corresponding to at least one pattern contour; means for extracting at least one scene contour from a scene image; means for generating vector information for each of said at least one scene contours; and a means for locating the pattern image within the scene image using the at least one reference tables and the vector information for the at least one scene contours.

15 Claims, 12 Drawing Sheets

OTHER PUBLICATIONS

Ansari et al., "On Detecting Dominant Points," *Pattern Recognition*, vol. 24, No. 5, pp. 441-451, 1991.

Pao et al., "Shapes Recognition Using the Straight Line Hough Transform: Theory and Generalization," *IEEE Transactions on Pattern Analysis and Machine Intelligence*, vol. 14, No. 11, pp. 1076-1089, 1992.

Henikoff et al., "Representative Patterns for Model-Based Matching," *Pattern Recognition*, vol. 26, No. 7, pp. 1087-1098, 1993.

Wen et al., "Recognition and Inspection of Manufactured Parts Using the Line Moments of Their Boundaries," *Pattern Recognition*, vol. 26, No. 10, pp. 1461-1471, 1993.

Gupta et al., "A New Approach for Aggregating Edge Points into Line Segments," *Pattern Recognition*, vol. 26, No. 7, pp. 1069-1086, 1993.

Bunke et al., "Applications of Approximate String Matching to 2D Shape Recognition," *Pattern Recognition*, vol. 26, No. 12, 1797-1812, 1993.

Toet et al., "Genetic contour matching," *Pattern Recognition Letters*, No. 16, pp. 849-856, 1995.

Pikaz et al., "Optimal Polygonal Approximation of Digital Curves," *Pattern Recognition*, vol. 28, No. 3, pp. 373-379, 1995.

Pikaz et al., "Matching of Partially Occluded Planar Curves, " *Pattern Recognition*, vol. 28, pp. 199-209, 1995.

Tsai, "Locating Overlapping Industrial Parts for Robotic Assembly," *Int. J. Adv. Manuf. Technol.*, vol. 12, pp. 288-302, 1996.

Cass, "Polynomial-Time Geometric Matching for Object Recognition," *International Journal of Computer Vision*, 21 (1/2), pp. 37-61, 1997.

*Machine Vision: Theory, Algorithms, Practicalities*, Circle Detection, pp. 207-212.

Chapter 4, Boundary Detection, pp. 128-131.

D.H. Ballard, *"Generalizing The Hough Transform To Detect Arbitary Shapes"*, Sep. 23, 1980, pp. 111-122.

* cited by examiner

SYSTEM AND METHOD FOR PATTERN IDENTIFICATION

BACKGROUND OF THE INVENTION

1. Field of the Invention

This invention relates to machine vision, and more particularly, to a system and method for pattern identification.

2. Description of the Related Art

Automated manufacturing processes often rely on machine vision systems to identity and locate parts that are being assembled. This allows a machine, such as a robot, to interact with (e.g., pick up) the individual parts using pattern recognition. For example, the pattern could be an image of the part, such as an image of a keypad of a cellular phone unit that is to be assembled in a housing. A linear pattern, such as a cross hair, may also be used to aid in precision alignment.

Various methods of machine vision positioning are currently practiced, including variations based on the general Hough transform and variations based on correlation (template matching). Correlation may use binary exclusive-OR correlation and, more recently, gray-scale normalized correlation. One common element of these systems is that they require, as input, an image template of the part whose pattern is being located.

The Hough transform, however, is inefficient when the part to be located is subject to rotation because, generally, multiple analyses must be performed using different potential angles of rotation. Specifically, for each possible angle of rotation, the Hough transform generally requires a separate reference table. Accordingly, if a user wants to have full rotation search capability at ten degree increments in angles of rotation, then the Hough transform would require a minimum of thirty-six tables, and then sequential searches would have to be performed on each table. Because such a analysis is computationally demanding, the search time is significantly increased.

SUMMARY OF THE INVENTION

Therefore, a need has arisen for a system and method for pattern identification that overcomes these and other shortcomings of the related art.

According to one embodiment of the present invention, a method for locating a pattern is disclosed. The method includes the steps of (1) providing a pattern image corresponding to the pattern to be located; (2) extracting a pattern contour from the pattern image; (3) generating vector information for the pattern contours, relative to a reference point; (4) creating a reference table for storing the vector information, the reference tables corresponding to the pattern contour; (5) providing a scene image, which will be searched for the pattern; (6) extracting a scene contour from the scene image; (7) generating vector information for the scene contours; and (8) determining whether the pattern has been located within the scene image using the reference table and the vector information for the scene contour, and if so, identifying a location of the pattern within the scene image and an angle of rotation of the pattern within the scene image.

In another embodiment, a method for pattern recognition comprises the following steps: (1) extracting pattern vector information from at least one pattern image, each pattern image having a pattern reference point; (2) creating a reference table containing the pattern vector information for each of the at least one pattern image; (3) extracting scene contour information from a scene image; (4) calculating a potential reference point based on the scene contour information and the reference table; (5) matching the potential reference point with one of the at least one pattern reference points; and (6) identifying a pattern image corresponding to the matching pattern reference point.

In still another embodiment, a system for pattern identification is disclosed. The system includes a first image capture device that captures a pattern image which includes an image of a pattern; a second image capture device that captures a scene image to be searched for the pattern; a processor processing the images, which includes means for extracting at least one pattern contour from the pattern image; means for generating vector information for each of said at least one pattern contours, relative to a reference point; means for creating at least one reference table for storing vector information, each of said at least one reference tables corresponding to at least one pattern contour; a means for extracting at least one scene contour from a scene image; means for generating vector information for each of said at least one scene contours; and means for locating the pattern image within the scene image using the at least one reference tables and the vector information for the at least one scene contours.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE INVENTION

The preferred embodiment of the present invention and its advantages are best understood by referring to FIGS. 1 through 12 of the drawings, like numerals being used for like and corresponding parts of the various drawings.

Figure 1:
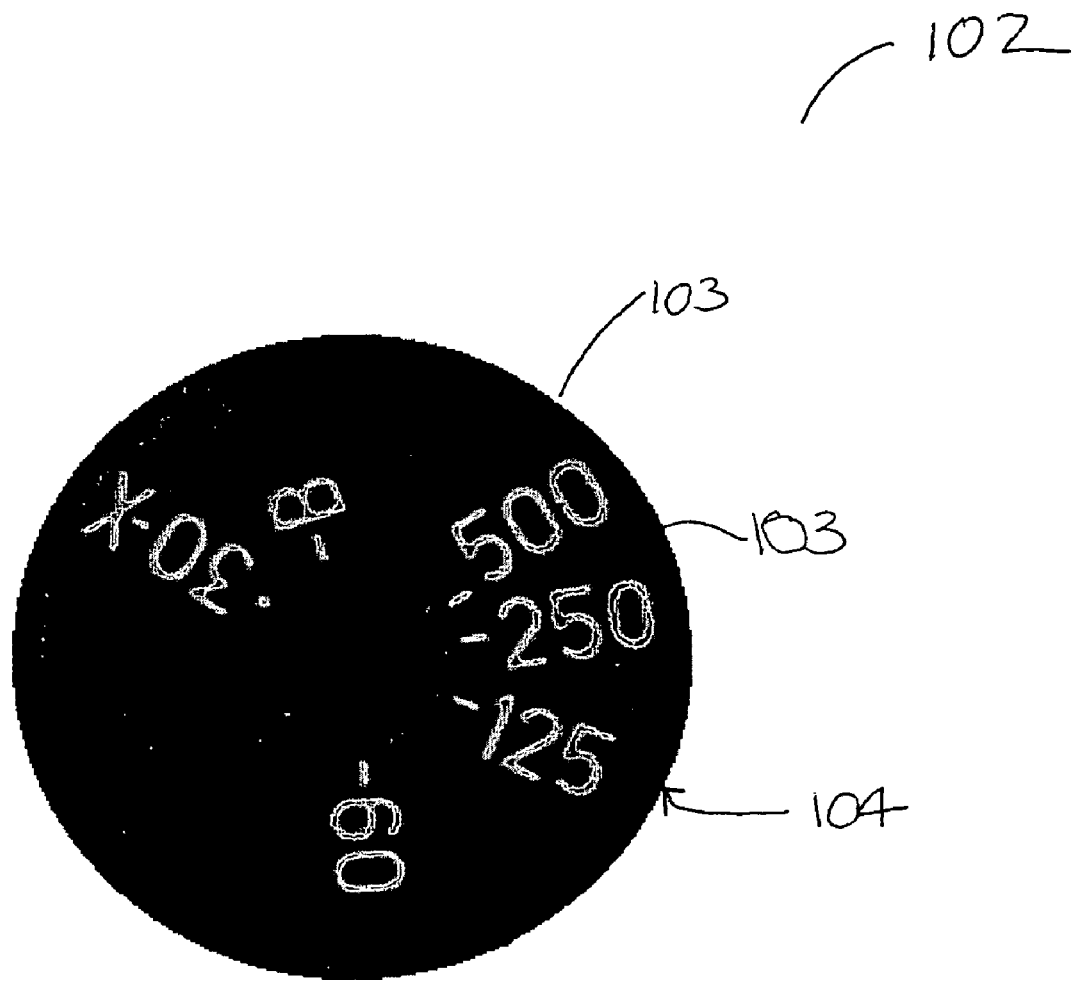
FIG. 1 depicts an example of a pattern.

For convenience, the present invention will be described with the following convention, with reference to image 102 shown in FIG. 1. Image 102 may be a digital image of a part or an object. In the figure, image 102 is a digital image of a shutter speed selection knob for a camera. It may be desirable for a machine to determine the precise orientation of this part (such as its rotation) so that a machine may properly interact with this part during assembly.

Image 102 may include one or more patterns 103. In the figure, image 102 includes several patterns 103, including, for example, the outer cylindrical surface of the knob, the hollow interior of the knob, as well as the various numbers and letters on the knob indicating different shutter speeds.

Pattern 103 may also include at least one contour 104. In general, contour 104 may be thought of as being an ordered list of edge point coordinates that describe a boundary of a pattern, including both internal and external boundaries. In the figure, for example, contour 104 is indicated at the outer edge of the knob.

Generally, the present invention "trains" on image 102 so that the invention will know the pattern of the part for which the invention is looking. During the training process, the present invention is given, or creates, a "pattern image," and the system trains on the pattern image. During the searching process, the present invention searches a "scene image" in an effort to locate the pattern that was used to train the system. So, when the term "pattern image" is used, this application is referring to the image used in training, and when the term "scene image" is used, this application is referring to the search process.

Figure 2:
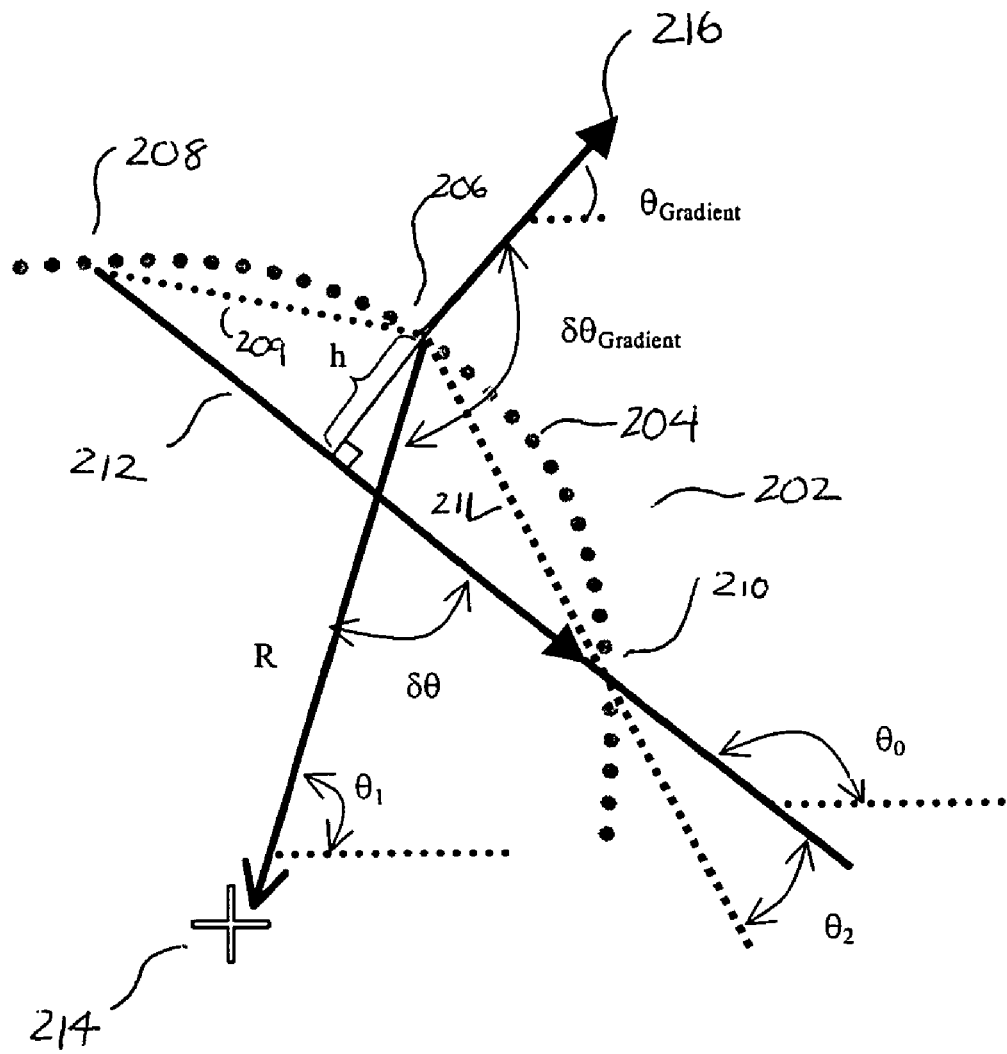
FIG. 2 illustrates an illustration of a contour according to one embodiment of the present invention.

A brief discussion of the theory of the present invention is provided. FIG. 2 illustrates a contour that has been extracted, for example, from a pattern image during the training process. Referring to FIG. 2, contour 202 includes a plurality of contour points 204, which lie along contour 202. Index point 206 (located at $(x_0, y_0)$), which is a contour point, is selected, and two reference points, back point 208 (located at $(x_1, y_1)$, and "behind" index point 206 by a constant k) and front point 210 (located at $(x_2, y_2)$, and "in front of" index point 206 by a constant k (not shown)) are selected. Variable k controls the locality of the curvature measurement. In one embodiment, k represents the number of contour points that separate back point 208 from index point 206, which is the same as the number of contour points separating front point 210 from index point 206. A smaller value for k gives very local curvature measurements, while a larger value for k gives more global measurements.

In one embodiment, indices of front point 208 and back point 210 may be selected automatically. In general, they are separated from index of index point 206 by k (i.e., each is k data points away from index point 206). The index of front point 208 is smaller than the index of index point 206 by k, while the index of back point 210 is larger than the index of index point 206 by k. For example, if $(x_0, y_0)$ is at index 100, then back point 208 is the point at index 90, and front point 210 is at index 110 (for k=10).

Generally, k is chosen based upon the severity of the curves in the pattern contours and based upon the number of contour points that are used to represent the contour. Generally, a smaller k may be preferred, but k must not be too small. A k of 10 will work in most standard applications.

Stick vector 212, which is a vector that connects back point 208 and front point 210, has a direction representing the direction of "crawl;" that is, the direction from back point 208 to front point 210. Stick vector 212 has an angle of $\theta_0$ relative to the horizontal axis.

In another embodiment, an additional back point (not shown) and an additional front point (not shown) may also be used. In general, these points may be indexed with a value greater than k. These points may be used to define an additional stick vector (not shown), which may provide additional information regarding contour 202.

Line 209 connects index point 206 and back point 208, while line 211 connects index point 206 and front point 210. Angle $\theta_2$ represents the angle between stick 212 and line 211.

Algorithm reference point 214, located at $(x_C, y_C)$, may be selected by a user, or it may be the centroid of the pattern, as will be discussed in greater detail below.

A distance h represents a contour curvature measure for contour point 206. The distance h is the shortest distance from index point 206 to stick 212. For example, for an appropriate k value, a value of h=0 indicates that the stick is falling on a straight line.

Vector R may be constructed by drawing a vector from contour point 206 to algorithm reference point 214. This vector has magnitude of d, a direction pointing from contour point 206 to algorithm reference point 214, and angle $\theta_1$ relative to the horizontal axis. Angle $\delta\theta$ is the angle between R and stick vector 212. Angle $\delta\theta$ may also be referred to as the "SR Angle." Angle $\delta\theta$ is rotation invariant. This means that regardless of any rotation of contour 202 (or rotation of the part/object) relative to the horizontal axis, this angle is the same for a particular point on contour 202. Because angle $\delta\theta$ is rotation invariant, it is an ideal variable, as it reduces search time significantly. It also eliminates the need for a separate table for each angle of rotation.

Angle $\delta\theta_{Gradient}$ is the angle between gradient 216 and vector R. This may also be referred to as the "GR Angle." In general, $\delta\theta_{Gradient}$ determines the position of algorithm reference point 214 relative to stick vector 212 (i.e., (on what side of stick vector 212) so long as contour 202 is crawled on in the same direction when training and when searching. Crawling in the same direction may not happen in every image, due to disconnection or extra connection of a contour.

In general, the lengths and angles identified above may be determined by trigonometry, or by other higher-level mathematics.

Figure 3:
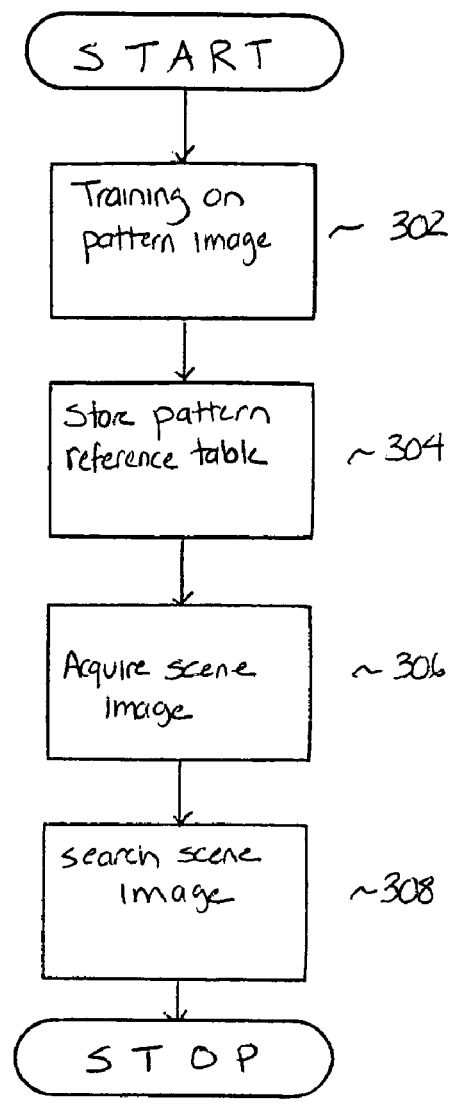
FIG. 3 illustrates a flowchart of a method for pattern identification according to one embodiment of the present invention.
Figure 4:
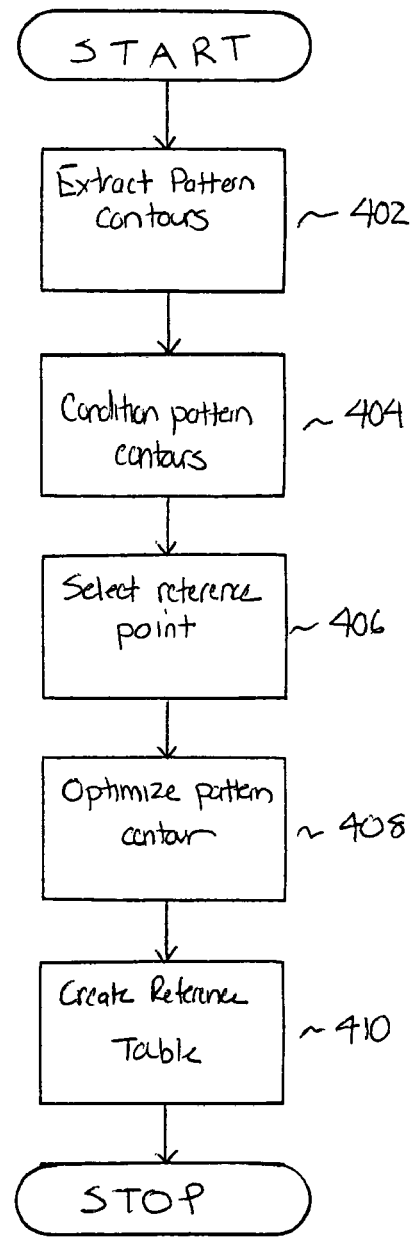
FIG. 4 illustrates a flowchart of a training process.

With the convention and theory described above in mind, a flowchart of a method for pattern identification according to one embodiment of the present invention is provided in FIG. 3. First, in step 302, the system is "trained" on a pattern image. Referring to FIG. 4, a flowchart of the training process is provided. First, in step 402, pattern contours are extracted from the pattern image. In one embodiment, this may be achieved by detecting the levels of the edges on the pattern image, which computes the optimal value for the edge level (i.e., the edge strength) in order to filter out noise edge pixels. Other filters may be used as desired.

Pattern contours may be extracted from the pattern image, preferably after any conditioning. In one embodiment, an extraction engine, such as EdgeCrawler, developed by Imaging Technology, Inc., of Bedford, Mass., may be used to extract the contours from the pattern image. The extraction engine may extract edge pixels by running a Gaussian filter followed by a Sobel transform. Non-maxima suppression may be performed on all edge points above the value of the level detected by the edge level detection. In another embodiment, a top-down crawler may be used to create a contour from the edges.

In another embodiment, the edges may be extracted by locating at least one edge of the pattern image of the scene image and recording a starting point for the edge. The edge is then "crawled" along; that is, each pixel along the edge is analyzed. As the pixels are analyzed, they may be extracted from the edge, and then may be filtered. A contour may then be created from the filtered and extracted pixels.

Next, in step 404, the extracted contours may be conditioned. This step helps to identify and add undetected edge points, if any. In addition, aliased edge points may be removed. In one embodiment, each contour may be spatially filtered with a 5×1 filter. Of course, different filters may be used. Each contour may then be normalized to create a new set of contours in which the distance between any neighboring points is 1.0 (one) pixel. Raw contour points may have a spacing that varies between 1 and 1.41 pixels in distance, depending on the angle between points. The result of the contour conditioning stage is at least one pattern contour.

In step 406, an algorithm reference (x, y) position may be selected. Step 406 may be exercised before step 404, or even after step 408. In one embodiment, the reference point may be the centroid coordinate, or central moment, of the pattern contour(s). At the end of searching, the algorithm reference point may be translated back to user coordinates.

In step 408, the pattern contour may be optimized. This may be accomplished by setting levels based on the analysis of pattern contours, including the number of contour points, the curvature statistics of contour points, etc. These points may be used to determine the values of each parameter.

In step 410, a reference table is created. This may be performed simultaneously with step 408. This may be accomplished by analyzing every contour in the pattern contours, and for every point on the contour, extracting the contour curvature, h, the vector R (r, $\theta_1$), the angle between the R vector and the stick vector $\delta\theta$, and the angle $\delta\theta_{Gadient}$. In one embodiment, these values may be grouped in a reference table according to their contour curvature h in order to decrease search time, and to better shape the peak shape in the pattern location image, discussed below.

An example of a reference table is provided below, wherein each rectangle may include data represented generically by variable. The fact that the identical variables are shown in the table is not intended to suggest that each measurement for the variables are identical.

| h = 0 | h = 1 | h = 2 | h = 3 |
|---|---|---|---|
| r | r | r | r |
| $\theta_1$ | $\theta_1$ | $\theta_1$ | $\theta_1$ |
| $\delta\theta$ | $\delta\theta$ | $\delta\theta$ | $\delta\theta$ |
| $\delta\theta_{Gradient}$ | $\delta\theta_{Gradient}$ | $\delta\theta_{Gradient}$ | $\delta\theta_{Gradient}$ |
| r | r | | r |
| $\theta_1$ | $\theta_1$ | | $\theta_1$ |
| $\delta\theta$ | $\delta\theta$ | | $\delta\theta$ |
| $\delta\theta_{Gradient}$ | $\delta\theta_{Gradient}$ | | $\delta\theta_{Gradient}$ |
| r | r | | |
| $\theta_1$ | $\theta_1$ | | |
| $\delta\theta$ | $\delta\theta$ | | |
| $\delta\theta_{Gradient}$ | $\delta\theta_{Gradient}$ | | |
| r | | | |
| $\theta_1$ | | | |
| $\delta\theta$ | | | |
| $\delta\theta_{Gradient}$ | | | |

Referring again to FIG. 3, in step 304, once the training is complete, the reference table and related information may be stored in a database. In one embodiment, the database may include a plurality of reference tables for different pattern images.

In step 306, a scene image is acquired. In one embodiment, the scene image may be acquired in real-time; in other embodiments, the scene image may be acquired from a database, or provided to the system form an outside source.

Figure 5:
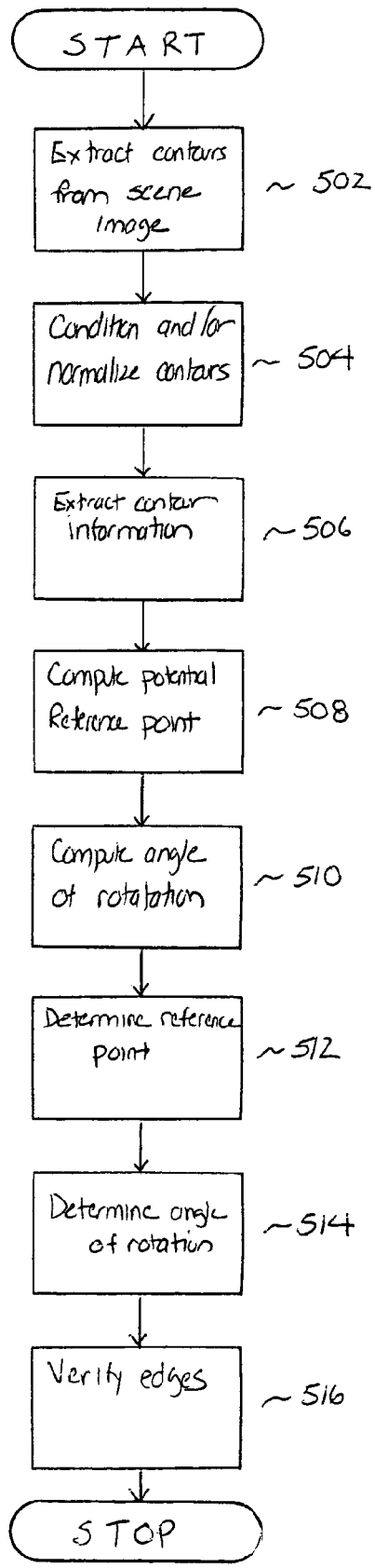
FIG. 5 illustrates a flowchart of a search process.

In step 308, the scene image is searched. Referring to FIG. 5, a flowchart of the search process is provided. In step 502, contours are extracted from the scene image. In one embodiment, contours may be extracted from the scene image in the same way that contours were extracted from the pattern image. Therefore, a detailed description of this step is omitted.

In step 504, the contours may be conditioned and/or normalized. In one embodiment, contours may be conditioned and/or normalized from the scene image in the same way that contours were conditioned and/or normalized from the pattern image. Therefore, a detailed description of this step is omitted.

In step 506, as the contour points are crawled, the values of h, $\theta_0$, and $\theta_{Gradient}$ for each contour point are determined.

In step 508, the location of a potential reference point is computed from scene $\theta_0$ (the angle between a scene stick and the horizontal axis) and R (r, $\delta\theta_1$) of a cell in the table. In doing so, the scene contour curvature value, h, may be used to select a column of the table. A potential reference point for the scene pattern is calculated for each table cell in that column (all the points with the same contour curvature value h).

The potential reference point (x, y) is entered into a reference point accumulator which "counts" each instance of a potential reference point. In one embodiment, a pattern location image, in which the pixel value at the reference coordinates is incremented each time a calculation yields a reference point with that coordinate, is used as the accumulator. In other words, the "height" of a particular coordinate increases each time the particular coordinate is calculated as a potential reference point. In one embodiment, this step may be repeated for each of the scene contour points.

Figure 6A:
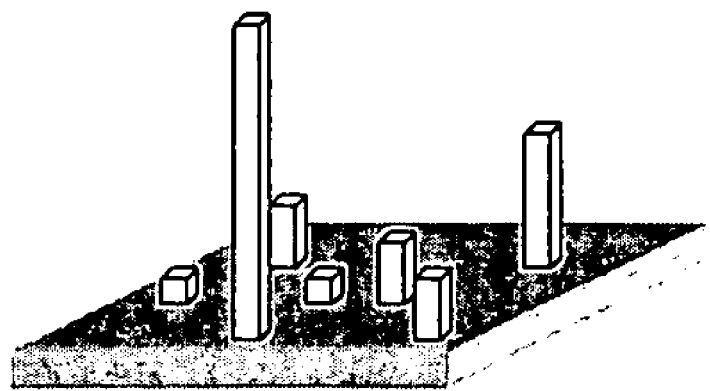
FIG. 6a illustrates an example of a pattern (x, y) location image according to one embodiment of the present invention.

An example of a pattern location image is provided in FIG. 6a. In FIG. 6a, the tallest column reflects an accumulator that shows the greatest number of "hits," and hence, the greater likelihood of a match.

Referring again to FIG. 5, in step 510, the angle of rotation of the pattern may be computed. This angle may be computed based upon the angle difference between $\theta_0$ (stick vector angle) of scene point, and $\theta_0$ in the table cell. This angle is also entered into an angle accumulator, which tallies each instance of an angle. In one embodiment, a pattern angle image in which the angle value is stored (stacked) at computed (x, y) coordinates may be used.

In another embodiment, the angle difference between $\theta_{Gradient}$ of the scene point, and $\theta_{Gradient}$ in the table cell may be used. In general, however, $\theta_0$ may be more stable than $\theta_{Gradient}$.

Figure 6B:
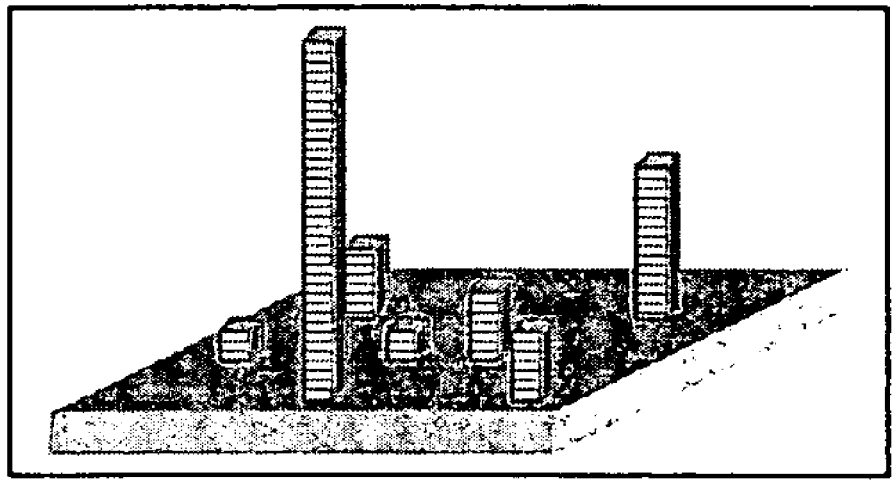
FIG. 6b illustrates an example of a pattern angle image according to one embodiment of the present invention.

An example of a pattern angle image is provided in FIG. 6b.

Referring again to FIG. 5, in step 512, after all points are processed, the accumulator for the potential reference point is analyzed to determine the best potential reference point.

Next, in step 514, the angle of rotation is determined. In one embodiment, a clustering algorithm, may be used to determine the angle of rotation. The clustering algorithm may return a predetermined number of strong "peaks," as well as smaller peaks near a strong peak. The clustering algorithm may average the peaks to return the most likely angle of rotation.

In step 516, edges may be verified. After the best potential reference point and rotation angle for the pattern are identified, the position of all edge points for the potential reference point (forming a potential pattern) may be translated into the coordinates of the scene. This may be done by moving a position of the potential pattern to the potential reference point, and then rotating the potential pattern using the angle returned by the search. Depending-on the accuracy, the two sets of edge points (edge points for the potential pattern, and edge points for the pattern) may overlap spatially. The movement and the rotation should cause the edges of the potential pattern and the pattern image to overlap. The verification procedure verifies that, for each model edge point, there is a corresponding edge point in the scene.

Through processing all the points, two numbers can be measured: the number of edge points that verified positive (i.e., aligned or matched), and number of points that verified negative (i.e., did not align or did not match). These numbers may be used to compute a "score," which represents a similarity measure between the potential pattern edges and the pattern edges at given point and angle. For example: if the number of positive edge points (Np) is 1000, and the number of negative edge points (Nn) is 100, the "score" may be determined as:

$$Score = \frac{Np}{Np+Nn}$$

A In the example, the score is or 0.909, or 90.9%. The score may be used to determine whether or not the potential reference point is satisfactory.

It should be noted that the present invention may be implemented using an image capture device, such as a digital camera, as well as a processor. An example of a suitable processor is a Pentium®-series processor, manufactured by Intel, Inc., Santa Clara, Calif. In another embodiment, an application-specific integrated circuit (ASIC) may be used. In still another embodiment, a digital signal processor (DSP) may be used. Other processor types may be used as desired.

EXAMPLE

In order to better understand the present invention, an example is provided. This example does not limit the present invention in any way, and is intended to illustrate one embodiment of the present invention.

Figure 7:
FIG. 7 illustrates an example of a pattern image to be trained.
Figure 8:
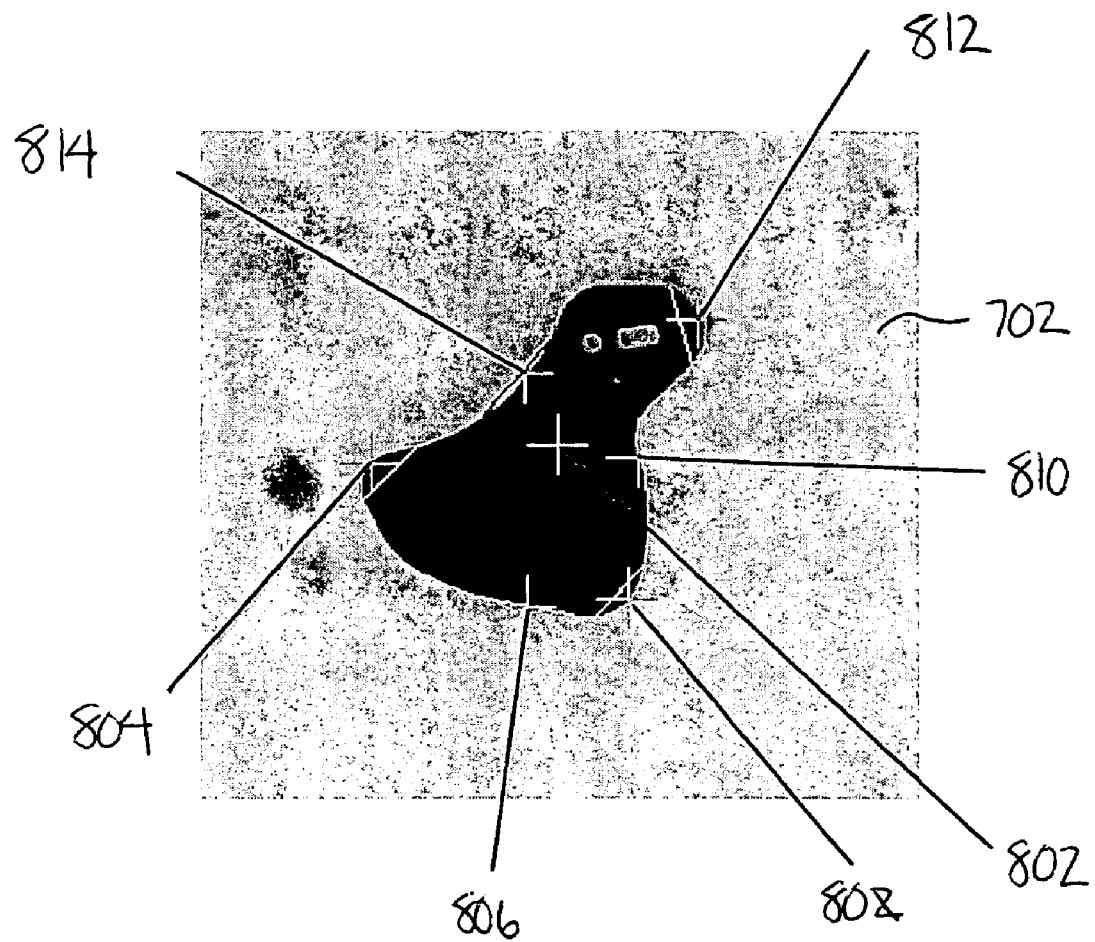
FIG. 8 illustrates the pattern image of FIG. 7 including index points, front and back points, and stick vectors.

The example may be understood by referring to FIGS. 7–12. FIG. 7 depicts a pattern that is to be trained; specifically, this figure includes sample shutter part 702. Referring to FIG. 8, shutter 702 has reference point 802, as well as index points 804, 806, 808, 810, 812, and 814. Each index point i ($x0_i$, $y0_i$) has a front point ($x2_i$, $y2_i$) and a back point ($x1_i$, $y1_i$), which are each connected by a stick vector.

If the coordinates for reference point 802 are $x_C$=284 and $y_C$=192, then the coordinates of the index points i, with their respective back points and front points, are:

| The points | | back points | | front points | |
|---|---|---|---|---|---|
| $x0_i :=$ | $y0_i :=$ | $x1_i :=$ | $y1_i :=$ | $x2_i :=$ | $y2_i :=$ |
| 211.51 | 198.79 | 209.60 | 214.65 | 226.55 | 193.37 |
| 272.20 | 255.50 | 287.68 | 257.52 | 257.44 | 251.46 |
| 310.51 | 252.06 | 315.91 | 240.71 | 295.49 | 258.13 |
| 315.12 | 196.70 | 314.50 | 186.36 | 318.16 | 211.00 |
| 337.74 | 143.04 | 326.81 | 129.85 | 338.54 | 156.32 |
| 271.44 | 164.44 | 262.71 | 174.34 | 280.55 | 151.78 |

Figure 9:
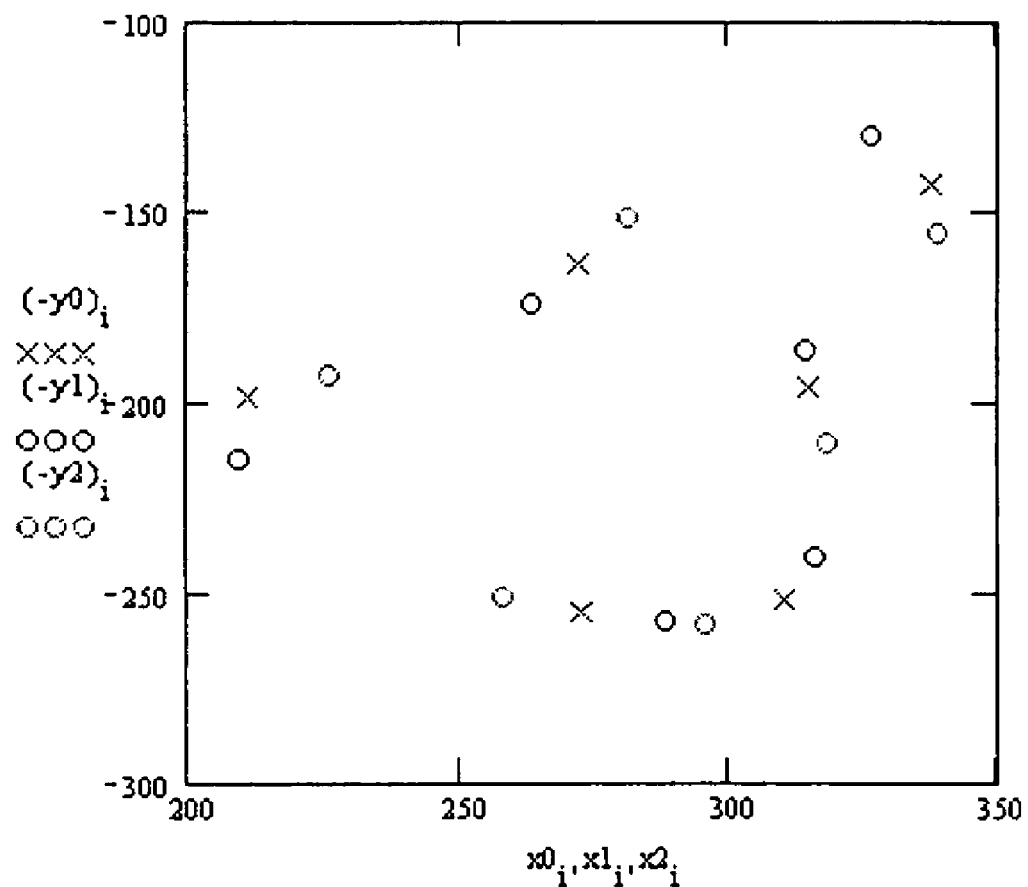
FIG. 9 illustrates a graphical plot of the points identified in FIG. 8.

These points are plotted in the graph of FIG. 9, with the index points plotted as "x" and the back and front points plotted as "o."

Next, the angle of each stick vector with respect to the x-axis, $\theta_0$, for each point, i, is determined. This may be determined by the following equation:

$$\Theta_{0i} \arctan[x2_i-x1_i,(y2_i-y1_i)-1]$$

Thus, for each stick vector, the angle $\theta_0$ is:

$$\theta 0 = \begin{bmatrix} 0.898 \\ 2.944 \\ -2.435 \\ -1.423 \\ -1.154 \\ 0.902 \end{bmatrix}$$

The vector angle of the R vector, $\theta_1$, for each index point i may be determined by the following equation:

$$\Theta_{1i} := \arctan[x0_i-xc,-(y0_i-yc)]$$

Thus, the resulting angles are:

$$\theta 1 = \begin{bmatrix} -3.048 \\ -1.755 \\ -1.155 \\ -0.15 \\ 0.739 \\ 1.998 \end{bmatrix}$$

The magnitude of the R vector, r, at point with index i may be determined by the following equation:

$$r_i = \sqrt{(xc-x0_i)^2 + (yc-y0_i)^2}$$

The angle difference $\delta\theta$ (the SR Angle) for each index point i is then determined by subtracting $\theta_1$ from $\theta_0$:

$$\delta\theta = \begin{bmatrix} -3.946 \\ -4.698 \\ 1.28 \\ 1.273 \\ 1.893 \\ 1.097 \end{bmatrix}$$

Next, angle $\theta_2$ for each index point i is determined by the equation:

$$\Theta_{2i} = \arctan[x2_i-x0_i,-(y2_i-y0_i)]$$

Next, the contour curvature, h, for each point, i, is determined.

$$h_i := \sqrt{(x2_i-x0_i)^2+(y2_i-y0_i)^2} \cdot \sin(\alpha_i)$$

Where $\alpha_i = \theta_1 - \theta_2$.

Thus, the values of h are:

$$h = \begin{bmatrix} 8.387 \\ 1.061 \\ 5.13 \\ -0.906 \\ 4.649 \\ -0.707 \end{bmatrix}$$

After these computations, the reference table is created. For the example, the reference table is:

$$h = \begin{bmatrix} 8.387 \\ 1.061 \\ 5.13 \\ -0.906 \\ 4.649 \\ -0.707 \end{bmatrix} \quad r = \begin{bmatrix} 72.807 \\ 64.587 \\ 65.65 \\ 31.473 \\ 72.698 \\ 30.287 \end{bmatrix} \quad \theta 0 = \begin{bmatrix} 0.898 \\ 2.944 \\ -2.435 \\ -1.423 \\ -1.154 \\ 0.902 \end{bmatrix} \quad \delta\theta = \begin{bmatrix} -3.946 \\ -4.698 \\ 1.28 \\ 1.273 \\ 1.893 \\ 1.097 \end{bmatrix}$$

In order to aid in the description of the search process, and to avoid confusion, a subscript r will be added to variables h and $\theta_0$ in the search procedure.

Figure 10:
FIG. 10 illustrates scene image to be searched for the pattern shown in FIG. 7.

Referring to FIG. 10, a scene image is provided. In the same manner described above, the contours are extracted and processed. As an example, several edge points have been selected to show computations in detail. For FIG. 10, the coordinates of the index points i, with their respective back points and front points, are:

| $x0_i :=$ | $y0_i :=$ | $x1_i :=$ | $y1_i :=$ | $x2_i :=$ | $y2_i :=$ |
|---|---|---|---|---|---|
| 454.44 | 320.86 | 459.39 | 306.41 | 439.14 | 325.28 |
| 404.46 | 256.85 | 389.00 | 251.44 | 417.90 | 262.40 |
| 365.49 | 253.50 | 358.95 | 264.30 | 381.54 | 249.97 |
| 353.11 | 307.43 | 352.36 | 318.21 | 352.21 | 293.48 |
| 321.81 | 357.01 | 331.54 | 370.95 | 324.09 | 343.99 |
| 390.35 | 345.81 | 400.95 | 338.31 | 380.08 | 357.62 |

Figure 11:
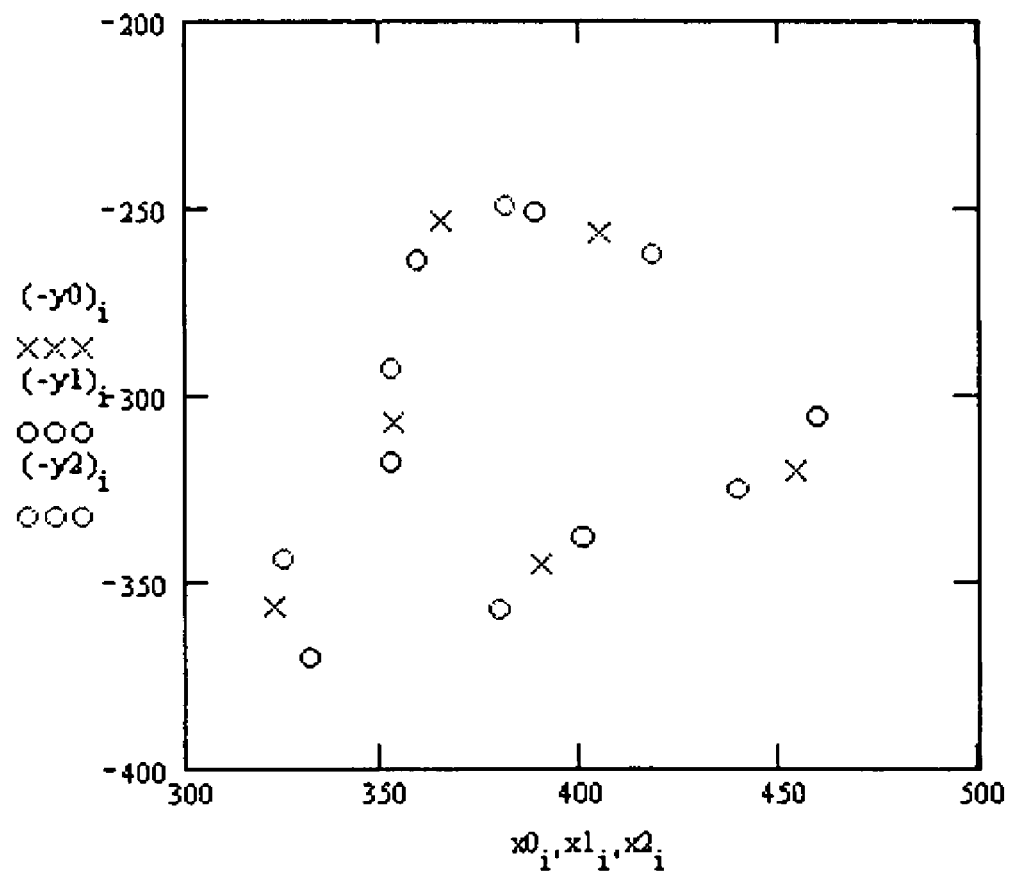
FIG. 11 illustrates a plot of the index points and front and back points of the scene image of FIG. 10.

These points are plotted in the graph of FIG. 11, with the index points plotted as "x" and the back points plotted as "o."

Next, the angle of each stick vector with respect to the x-axis, $\theta_0$, the angle $\theta_2$, and the contour curvature hr for each point, i, is determined in the same manner described above. Thus, the stick vector angles $\theta_0$ and the contour curvatures hr are:

$$\theta_0 = \begin{bmatrix} -2.391 \\ -0.362 \\ 0.565 \\ 1.577 \\ 1.84 \\ -2.395 \end{bmatrix} \quad hr = \begin{bmatrix} 8.837 \\ 1.061 \\ 5.13 \\ -0.906 \\ 4.649 \\ -0.707 \end{bmatrix}$$

Figure 12:
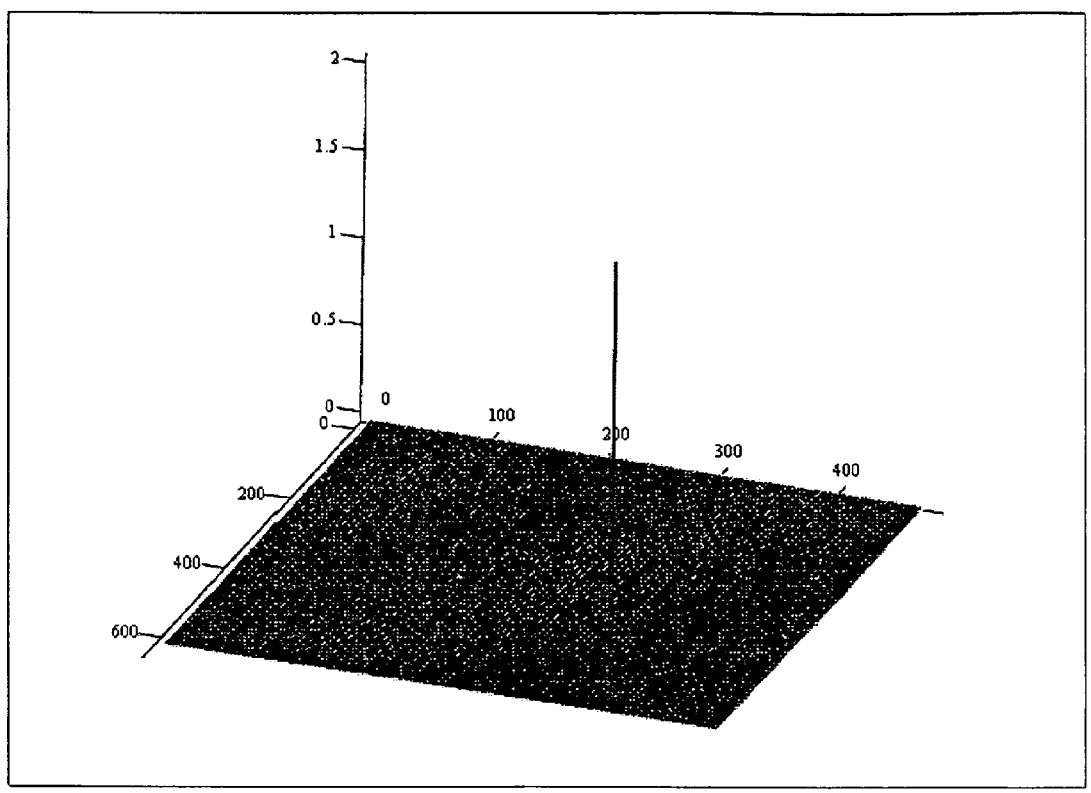
FIG. 12 illustrates an image of the accumulator for the scene image of FIG. 10.

Next, the potential reference point is calculated. First, for points with a contour curvature above ±7, only one point exists at i=0. Thus, the potential reference point and angle of rotation are calculated for this point:

$\theta 1_0 := \theta 0_0 + \delta\theta_0$ $xcfound_0 := x0_0 - r_0 \cdot \cos(\theta 1_0) \quad xcfound_0 = 381.741$ $ycfound_0 := y0_0 + r_0 \cdot \sin(\theta 1_0) \quad ycfound_0 = 316.883$ $rotAngle_0 := \theta 0r_0 - \theta 0_0 \quad rotAngle_0 = 3.29$ For points with a contour curvature above about ±5, two points exist at i=2 and i=4. Thus, the potential reference point and angle of rotation are calculated for these points:

$\theta 1_2 := \theta 0_2 + \delta\theta_2$ $xcfound_2 := x0_2 - r_2 \cdot \cos(\theta 1_2) \quad xcfound_2 = 383.297$ $ycfound_2 := y0_2 + r_2 \cdot \sin(\theta 1_2) \quad ycfound_2 = 316.689$ $rotAngle_2 := \theta 0r_1 - \theta 0_2 \quad rotAngle_2 = 3.001$ $\theta 1_4 := \theta 0_4 + \delta\theta_4$ $xcfound_4 := x0_4 - r_4 \cdot \cos(\theta 1_4) \quad xcfound_4 = 382.163$ $ycfound_4 := y0_4 + r_4 \cdot \sin(\theta 1_4) \quad ycfound_4 = 316.481$ $rotAngle_4 := \theta 0r_4 - \theta 0_4 \quad rotAngle_4 = 2.994$ For points with a contour curvature of about ±1, three points exist at i=1, i=3, and i=5. Thus, the potential reference point and angle of rotation are calculated for these points:

$\theta 1_1 := \theta 0_1 + \delta\theta_1$ $xcfound_1 := x0_2 - r_1 \cdot \cos(\theta 1_1) \quad xcfound_1 = 382.408$ $ycfound_1 := y0_1 + r_1 \cdot \sin(\theta 1_1) \quad ycfound_1 = 317.556$ $rotAngle_1 := \theta 0r_1 - \theta 0_1 \quad rotAngle_1 = 3.306$ $\theta 1_5 := \theta 0_5 + \delta\theta_5$ $xcfound_5 := x0_5 - r_5 \cdot \cos(\theta 1_5) \quad xcfound_5 = 382.199$ $ycfound_5 := y0_5 + r_5 \cdot \sin(\theta 1_5) \quad ycfound_5 = 316.64$ $rotAngle_5 := \theta 0r_5 - \theta 0_5 \quad rotAngle_5 = 3.297$ $\theta 1_3 := \theta 0_3 + \delta\theta_3$ $xcfound_3 := x0_3 - r_3 \cdot \cos(\theta 1_3) \quad xcfound_3 = 383.257$ $ycfound_3 := y0_3 + r_3 \cdot \sin(\theta 1_3) \quad ycfound_3 = 316.469$ $rotAngle_3 := \theta 0r_3 - \theta 0_3 \quad rotAngle_3 = -3$ After these calculations, the potential reference points ($xcfound_i$, $ycfound_i$) are added to an accumulator. Referring to FIG. 12, an image of the accumulator is provided. For the angles of rotation, the same process is repeated.

The results of the computation show that the potential reference point is about (383, 317) and at an angle of about 3.1 radians. These results coincide with the actual reference point location, which is (383,318) and an angle of 318.94=3.298 radians.

While the invention has been particularly shown and described by the foregoing detailed description, it will be understood by those skilled in the art that various other changes in form and detail may be made without departing from the spirit and scope of the invention.

What is claimed is:
1. A method for locating a pattern, comprising:
   providing a pattern image corresponding to the pattern to be located;
   extracting at least one pattern contour from the pattern image;

wherein the step of extracting at least one pattern contour from a pattern image comprises:
   extracting at least one pattern contour from the pattern image;
   identifying undetected edge points; and
   modifying the at least one pattern contour to add any undetected edge points;
generating vector information for each of said at least one pattern contours, relative to a reference point;
creating at least one reference table for storing the vector information, each of said at least one reference tables corresponding to said at least one pattern contour;
providing a scene image, which will be searched for the pattern;
extracting at least one scene contour from the scene image;
generating vector information for each of said at least one scene contours; and
determining whether the pattern has been located within the scene image using the at least one reference tables and the vector information for the at least one scene contours, and if so, identifying a location of the pattern within the scene image and an angle of rotation of the pattern within the scene image.

2. The method of claim 1, wherein the step of extracting at least one pattern contour from a pattern image further comprises:
   removing aliased edge points from the at least one pattern contour;
   spatially filtering the pattern contours; and
   resampling the filtered pattern contours.

3. A method for locating a pattern, comprising:
   providing a pattern image corresponding to the pattern to be located;
   extracting at least one pattern contour from the pattern image;
   generating vector information for each of said at least one pattern contours, relative to a reference point;
      wherein the step of generating vector information for each of said at least one pattern contours, relative to the selected reference point, comprises:
         choosing an index point corresponding to a point along said at least one pattern contour;
         establishing a front point and a back point for said index point, the front point and the back point defining a stick vector;
         establishing a R vector from the index point to the selected reference point;
         determining a contour curvature value for the index point, the contour curvature value being a shortest distance between the index point and the stick vector;
         determining a stick angle, the stick angle being an angle between the stick and the horizontal axis; and
         determining a SR angle for the index point, said SR angle being the angle between the stick vector and the R vector;
   creating at least one reference table for storing the vector information, each of said at least one reference tables corresponding to said at least one pattern contour;
   providing a scene image, which will be searched for the pattern;
   extracting at least one scene contour from the scene image;
   generating vector information for each of said at least one scene contours; and
   determining whether the pattern has been located within the scene image using the at least one reference tables and the vector information for the at least one scene contours, and if so, identifying a location of the pattern within the scene image and an angle of rotation of the pattern within the scene image.

4. The method of claim 3, wherein a plurality of index points are chosen, and contour curvature values and SR angles are calculated, respectively, for each of said plurality of index points.

5. The method of claim 4, wherein the step of generating vector information for each of said at least one pattern contours, relative to the selected reference point, further comprises:
   for each index point of said plurality of index points, determining a GR angle between a gradient of each of said index point and the respective R vectors for said index points.

6. The method of claim 3, wherein the step of creating at least one reference table containing said vector information comprises:
   grouping the SR angles based on a contour curvature value;
   grouping the stick angles based on the contour curvature value; and
   grouping the R vector information based on the contour curvature value.

7. The method of claim 6, wherein the step of creating at least one reference table containing said vector information further comprises:
   grouping the GR angles based on the contour curvature value at the index point.

8. The method of claim 3, wherein the SR angle is rotation invariant.

9. A method for locating a pattern, comprising:
   providing a pattern image corresponding to the pattern to be located;
   extracting at least one pattern contour from the pattern image;
   generating vector information for each of said at least one pattern contours, relative to a reference point;
      wherein the step of generating vector information for each of said at least one scene contours comprises:
         choosing at least one scene index point corresponding to a point along said at least one scene contour;
         determining a scene stick angle, the scene stick angle being an angle between a scene stick and the horizontal axis; and
         determining a scene contour curvature and a scene SR angle for each of said at least one scene index points;
   creating at least one reference table for storing the vector information, each of said at least one reference tables corresponding to said at least one pattern contour;
   providing a scene image, which will be searched for the pattern;
   extracting at least one scene contour from the scene image;
   generating vector information for each of said at least one scene contours; and
   determining whether the pattern has been located within the scene image using the at least one reference tables and the vector information for the at least one scene contours, and if so, identifying a location of the pattern within the scene image and an angle of rotation of the pattern within the scene image.

10. The method of claim 9, wherein the step of generating vector information for each of said at least one scene contours further comprises:
  determining a scene GR angle for each of said at least one scene index points.

11. A method for locating a pattern, comprising:
  providing a pattern image corresponding to the pattern to be located;
  extracting at least one pattern contour from the pattern image;
  generating vector information for each of said at least one pattern contours, relative to a reference point;
  creating at least one reference table for storing the vector information, each of said at least one reference tables corresponding to said at least one pattern contour;
  providing a scene image, which will be searched for the pattern;
  extracting at least one scene contour from the scene image;
  generating vector information for each of said at least one scene contours; and
  determining whether the pattern has been located within the scene image using the at least one reference tables and the vector information for the at least one scene contours, and if so, identifying a location of the pattern within the scene image and an angle of rotation of the pattern within the scene image;
  wherein the step of determining whether the pattern has been located comprises:
  calculating at least one potential reference point based on the extracted scene contour vector information and recording the instance of each of said at least one potential reference points;
  calculating at least one potential angle of rotation based on the extracted scene contour vector information and recording the instance of each of said at least one potential angles of rotation;
  wherein the step of calculating at least one potential angle of rotation based on the extracted scene contour vector information and recording the instance of each potential angle of rotation comprises:
  determining an angle difference between a scene stick angle and a stick angle in the reference table; and
  adding the potential angle of rotation to an angle accumulator;
  identifying a location of the pattern within the scene image using the recorded potential reference points; and
  determining an angle of rotation for the pattern within the scene image using the recorded potential angles of rotation.

12. A method for locating a pattern, comprising:
  providing a pattern image corresponding to the pattern to be located;
  extracting at least one pattern contour from the pattern image;
  generating vector information for each of said at least one pattern contours, relative to a reference point;
  creating at least one reference table for storing the vector information, each of said at least one reference tables corresponding to said at least one pattern contour;
  providing a scene image, which will be searched for the pattern;
  extracting at least one scene contour from the scene image;
  generating vector information for each of said at least one scene contours; and
  determining whether the pattern has been located within the scene image using the at least one reference tables and the vector information for the at least one scene contours, and if so, identifying a location of the pattern within the scene image and an angle of rotation of the pattern within the scene image;
  wherein the step of determining whether the pattern has been located comprises:
  calculating at least one potential reference point based on the extracted scene contour vector information and recording the instance of each of said at least one potential reference points;
  calculating at least one potential angle of rotation based on the extracted scene contour vector information and recording the instance of each of said at least one potential angles of rotation;
  identifying a location of the pattern within the scene image using the recorded potential reference points; and
  determining an angle of rotation for the pattern within the scene image using the recorded potential angles of rotation
  wherein the step of determining an angle of rotation for the pattern image comprises:
  clustering the potential angles of rotation; and
  identifying at least one potential angle of rotation where clustering has occurred beyond a predetermined threshold.

13. A method for pattern recognition, comprising:
  extracting pattern vector information from at least one pattern image, each pattern image having a pattern reference point;
  creating a reference table containing the pattern vector information for each of the at least one pattern image;
  extracting scene contour information from a scene image;
  calculating a potential reference point based on the scene contour information and the reference table;
  matching the potential reference point with one of the at least one pattern reference points;
  identifying a pattern image corresponding to the matching pattern reference point; and
  identifying an angle of rotation for the scene image.

14. A method for pattern recognition, comprising:
  extracting pattern vector information from at least one pattern image, wherein the pattern vector information includes a rotation invariant angle and each pattern image having a pattern reference point;
  wherein the rotation invariant angle is defined by:
  identifying at least one pattern index point on a contour of the pattern image;
  identifying a front point and a back point for the pattern index point, the front point and back point defining a stick vector; and
  identifying a R vector defined by the index point and the pattern reference point;
  wherein the rotation invariable angle is defined by a SR angle between the stick vector and the R vector;
  creating a reference table containing the pattern vector information for each of the at least one pattern image;
  extracting scene contour information from a scene image;
  calculating a potential reference point based on the scene contour information and the reference table;
  matching the potential reference point with one of the at least one pattern reference points; and
  identifying a pattern image corresponding to the matching pattern reference point.

15. A method for pattern recognition, comprising:
  extracting pattern vector information from at least one pattern image, each pattern image having a pattern reference point;
  creating a reference table containing the pattern vector information for each of the at least one pattern image;
  extracting scene contour information from a scene image;
  calculating a potential reference point based on the scene contour information and the reference table;
  wherein the step of calculating a potential reference point based on the scene contour information and the reference table comprises:
    identifying at least one scene index point on a contour of the scene image;
    calculating the potential reference point for each of the scene index points based on the reference table;
    adding the potential reference point to a reference point accumulator; and
    determining a likely potential reference point;
  matching the potential reference point with one of the at least one pattern reference points; and
  identifying a pattern image corresponding to the matching pattern reference point.

\* \* \* \* \*